(12) United States Patent
Mizuno

(10) Patent No.: US 6,237,329 B1
(45) Date of Patent: May 29, 2001

(54) COMBUSTION CONTROLLER FOR LEAN BURN ENGINES

(75) Inventor: Hiroyuki Mizuno, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/216,061

(22) Filed: Dec. 18, 1998

(30) Foreign Application Priority Data

Dec. 25, 1997 (JP) .................................................... 9-358522

(51) Int. Cl.⁷ ........................................................ F01N 3/00
(52) U.S. Cl. ................................ 60/285; 60/274; 60/278; 60/295; 123/406; 123/119 A
(58) Field of Search .............................. 60/285, 274, 278, 60/295, 286, 276; 123/406, 119 A

(56) References Cited

U.S. PATENT DOCUMENTS

| | | | | |
|---|---|---|---|---|
| 4,106,448 | * | 8/1978 | Noguchi et al. | 60/285 |
| 4,164,207 | * | 8/1979 | Okitsu et al. | 123/119 A |
| 4,693,076 | * | 9/1987 | Chujo et al. | 60/274 |
| 5,279,115 | * | 1/1994 | Inoue et al. | 60/274 |
| 5,448,887 | * | 9/1995 | Takeshima | 60/278 |
| 5,570,574 | * | 11/1996 | Yamashita et al. | 60/276 |
| 5,595,060 | * | 1/1997 | Togai et al. | 60/274 |
| 5,848,529 | * | 12/1998 | Katoh et al. | 60/274 |
| 5,894,724 | * | 4/1999 | Minowa et al. | 60/274 |
| 5,909,723 | * | 6/1999 | Ichimoto et al. | 123/406 |
| 5,964,088 | * | 10/1999 | Kinugasa et al. | 60/286 |
| 5,996,338 | * | 12/1999 | Hirota | 60/285 |

FOREIGN PATENT DOCUMENTS

| | | |
|---|---|---|
| 0 752 521 A1 | 1/1997 | (EP) . |
| 62186034 | * 8/1987 | (JP) . |
| 04307058 | 4/1994 | (JP) . |
| 6193487 | 7/1994 | (JP) . |
| 7332071 | 12/1995 | (JP) . |
| 8200045 | 8/1996 | (JP) . |
| 8218918 | 8/1996 | (JP) . |
| 8319862 | 12/1996 | (JP) . |
| 9158759 | * 6/1997 | (JP) . |

* cited by examiner

Primary Examiner—Thomas Denion
(74) Attorney, Agent, or Firm—Kenyon & Kenyon

(57) ABSTRACT

A method and apparatus for controlling a vehicle engine. A catalyst in the exhaust system for reducing NOx emissions. When the catalyst is full, the air-fuel mixture is temporarily enriched for reducing the level of NOx. A primary control procedure regulates torque fluctuation or other characteristic during normal operation. For example, the primary control procedure may control the intake air. During the primary control procedure, a coefficient is determined, based on the operating state of the engine, to control the output characteristic. When the catalyst is full, a temporary control procedure varies the fuel-air ratio to increase the level of hydrocarbons delivered to the catalyst, which reduces the NOx. The temporary control procedure regulates the amount of fuel injected based on the same coefficient used in the primary control procedure. Therefore, the output characteristic is substantially unchanged by the temporary control procedure. The primary control procedure regulates torque fluctuation in one embodiment, and the coefficient may be based on the position of the throttle valve, the position of the EGR valve or the quantity of fuel injected into the combustion chambers. In another embodiment, the primary control procedure is for controlling the ignition timing, and the temporary control procedure uses a coefficient based on the timing retardation determined in the primary control procedure.

18 Claims, 4 Drawing Sheets

COMBUSTION CONTROLLER FOR LEAN BURN ENGINES

BACKGROUND OF THE INVENTION

The present invention relates to a combustion controller for lean burn type internal combustion engines. More specifically, the present invention pertains to a combustion controller for lean burn engines having a nitrogen oxide storage-reduction catalyst in their exhaust passages.

Generally, in conventional engines, fuel is injected into an intake port located upstream of a combustion chamber. The injected fuel is mixed with air in the port. In this way, a homogeneous mixture of fuel and air is supplied to the combustion chamber. In this type of engine, a throttle valve adjusts the opening degree of the intake passage. The throttle valve moves by accelerator manipulation. Accordingly, the amount of the mixture supplied to the combustion chamber is adjusted, and this controls the engine output.

However, in such a homogeneous combustion engine, low negative pressure, or great vacuum, is generated in the intake passage when the throttle valve moves. This increases pumping losses and lowers intake efficiency. On the other hand, some engines also use stratified charge combustion. In this technology, fuel is directly supplied to the combustion chamber with the intake passage widely opened, which results in an easy-to-burn mixture in the vicinity of the ignition plug.

In stratified combustion, when the engine load is low, fuel is directly injected into the combustion chamber. More precisely, fuel is injected in the vicinity of the ignition plug. The injected fuel burns with the intake air delivered from a widely open throttle valve. This lowers pumping losses. Further, stratified combustion engines can be operated with a lean air-fuel ratio, improving combustion efficiency.

In lean air-fuel ratio combustion, nitrogen oxide (NOx) is likely to be produced. To purify NOx, a NOx storage-reduction catalyst (NOx absorbent) is used in stratified combustion engines. A main component of the NOx storage-reduction catalyst is zeolite, which carries platinum. The zeolite stores NOx from the exhaust gas during the normal exhaust gas state. On the other hand, when the density of unburned hydrocarbons (HC) in the exhaust is high, the NOx stored in the catalyst is reduced by the HC and emitted as nitrogen gas ($N_2$).

Japanese Unexamined Publication No. 8-319862 describes an apparatus having a NOx storage-reduction catalyst. In this apparatus, so-called rich-spike control is performed. When the engine is continuously operated with a lean air-fuel ratio, the amount of NOx stored in the NOx catalyst reaches saturation, and extra NOx, not stored in the catalyst, is emitted in the exhaust gas. To prevent this, the air-fuel ratio is controlled to be temporarily rich, or "spiked", during a predetermined time interval. Then, the amount of HC in the exhaust gas increases and the NOx stored in the catalyst is reduced and emitted as nitrogen gas ($N_2$).

Furthermore, in the apparatus of the Japanese Publication, a fuel injection amount is controlled to prevent a sudden torque change caused by rich-spike control. That is, the fuel injection amount is set such that the output torque during rich-spike control, based on the injection amount, will be equal to the output torque before rich-spike control.

However, engines are subject to many control variables. Under normal operation, various kinds of engine control parameters such as the air intake amount, the exhaust gas recirculation (EGR) amount, the fuel injection amount, the ignition timing are frequently changed when torque fluctuation and knocking are controlled. When these parameters are changed, engine output (torque) is likely to change. In the prior art, when output torque changes based on various engine controls, rich-spike control may wrongly recognize a target torque state and set the fuel injection amount to a wrong value. As a result, a sudden torque change may occur.

SUMMARY OF THE INVENTION

The objective of the present invention is to provide a fuel injection controller to prevent sudden torque changes when rich-spike control is performed in lean burn type engines, the exhaust passages of which have a nitrogen oxide storage-reduction catalyst.

To achieve the above objective, the present invention provides an engine that includes a combustion chamber for burning air-fuel mixture and an exhaust passage for discharging the burned gases. The engine is operated under a primary control procedure, wherein the primary control procedure controls torque fluctuation or knocking. The engine further includes the following: a catalyst in the exhaust passage for storing nitrogen oxides contained in the exhaust gas and for reducing the level of emitted nitrogen oxides; a detector for detecting an engine operation state for the primary control procedure; a determiner for determining whether to change the air-fuel ratio of the air-fuel mixture based on the state of the catalyst; and a controller for temporarily changing the air-fuel ratio based on the decision of the determiner. The fuel supplied to the combustion chamber during the temporary change of the air-fuel ratio is based on the detected engine operation state, which is determined and used in the primary control procedure, so that the nitrogen oxides stored in the catalyst will be reduced.

The present invention also provides a method for controlling an engine that has a combustion chamber for burning air-fuel mixture, an exhaust passage for discharging the burned gases, and a catalyst provided in the exhaust passage for storing, reducing and emitting nitrogen oxides of the exhaust gas. The method includes the following steps: detecting the engine state under a primary control procedure; judging the state of the catalyst; determining whether to change the air-fuel ratio based on the state of the catalyst; controlling the air-fuel ratio according to the result of the determining step in a temporary control procedure, so that the nitrogen oxides stored in the catalyst will be reduced and emitted; and regulating the fuel supply to the combustion chamber during the temporary control procedure as a function of the engine state detected during the primary control procedure. Accordingly, an output characteristic of the engine during the temporary control procedure is substantially matched with that produced during the primary control procedure.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An embodiment of a combustion controller for lean burn engines according to the present invention will now be described in reference to the drawings.

Figure 1:
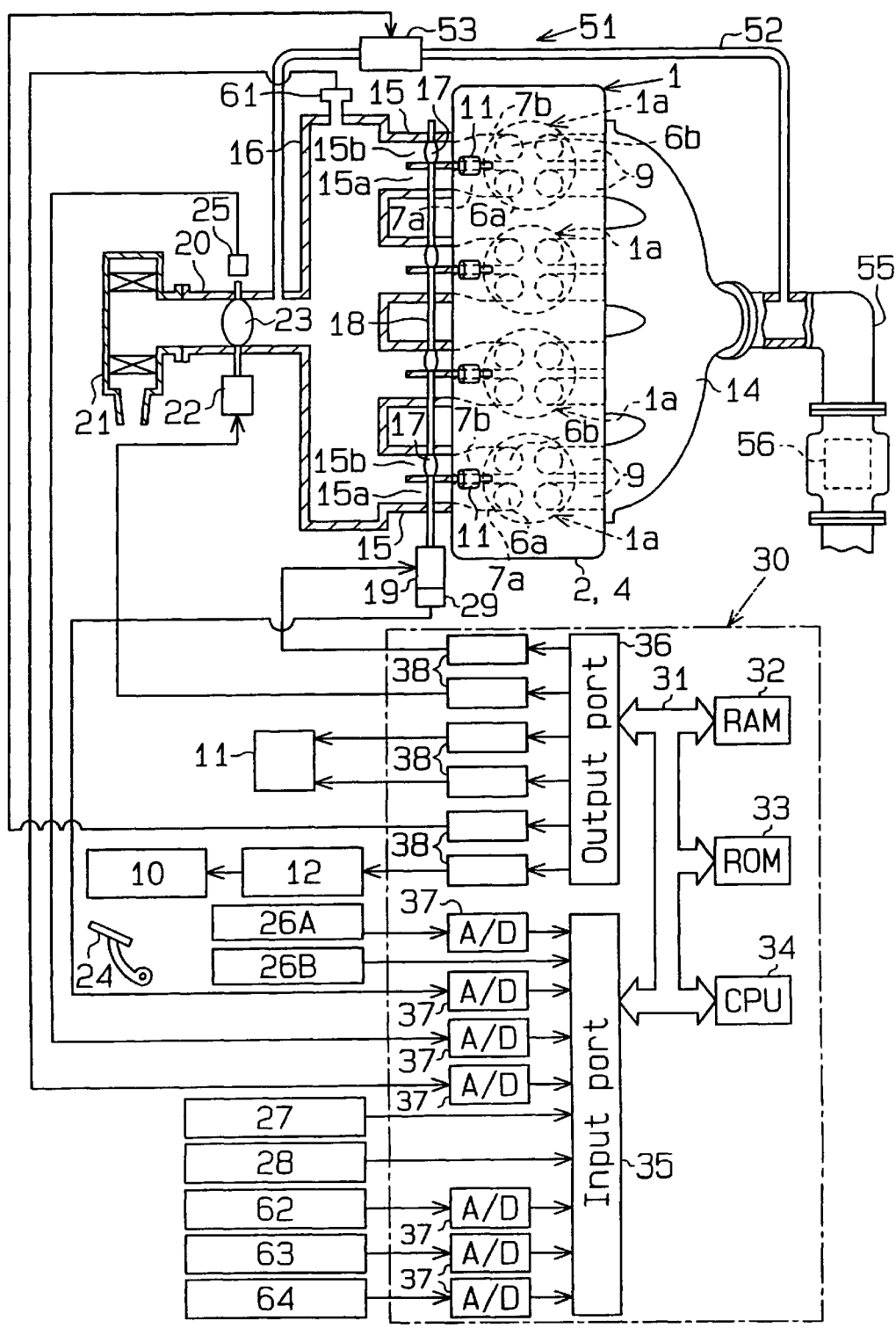
FIG. 1 is a diagrammatic view showing a combustion controller of a lean burn engine according to an embodiment of the present invention.
Figure 2:
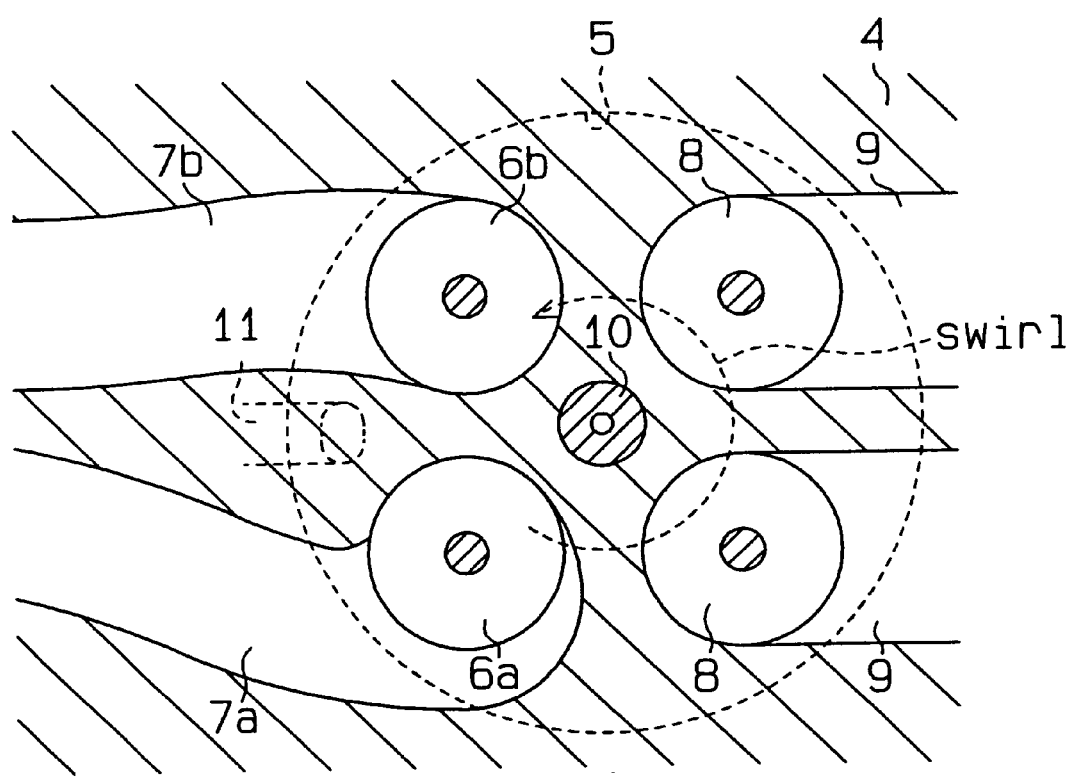
FIG. 2 is an enlarged, diagrammatic, cross-sectional view of the engine cylinder of FIG. 1.

As shown in FIG. 1 and 2, an engine 1 includes four cylinders 1a in a cylinder block 2. A piston is provided in each cylinder 1a and moves reciprocally in the cylinder 1a. A cylinder head 4 is located over the cylinder block 2. The cylinder head 4 and the pistons corresponding to each cylinder 1a partition four combustion chambers 5. Four valves are provided in the cylinder head 4 to correspond to each cylinder 1a. The four cylinders include a first intake valve 6a, a second intake valve 6b, and two exhaust valves 8. Further, a first intake port 7a, a second intake port 7b, and two exhaust ports 9 are formed in the cylinder head 4. The first intake port 7a is helical, and the second intake port 7a extends substantially straight. The shape difference between the two ports affects the flow of air supplied to the combustion chambers 5.

Also, as shown in FIG. 2, an ignition plug 10 is arranged in each cylinder 1a. Each plug 10 sparks due to high voltage applied by an ignition coil through a distributor (not shown). The ignition timing is determined by a signal transmitted from an ignitor 12.

Further, on the inner wall of the cylinder head 4, four fuel injectors 11 are respectively arranged in the vicinity of the corresponding first intake valve 6a and second intake valve 6b. Each injector 11 directly injects fuel into a corresponding combustion chamber 5.

The first and second intake ports 7a, 7b are respectively connected to a surge tank 16 through the first and second intake passages 15a, 15b. A swirl control valve 17 is located in each second intake passage 15b. A shaft 18 connects each swirl control valve 17 and the shaft 18 is joined to a step motor 19. The step motor 19 is controlled based on an output signal from an electronic control unit (ECU) 30. Instead of the step motor 19, an apparatus controlled in accordance with negative pressure from the intake ports 7a, 7b may also be used.

An air cleaner 21 is connected to the surge tank 16 through an intake duct 20. The intake duct 20 includes a throttle valve 23 operated by the step motor 22. When the throttle valve 23 is operated, the air intake amount supplied to each combustion chamber 5 through the intake duct 20 is adjusted. The throttle valve 23 of the present embodiment is electronically controlled by the step motor 22. The step motor 22 is controlled based on an output signal from the ECU 30. In the vicinity of the throttle valve 23, a sensor 25 for detecting the throttle opening degree is provided. An exhaust manifold 14 is connected to the exhaust port 9 of each cylinder 1a. Exhaust gas from the combustion chambers 5 passes through the exhaust manifold 14 and then flows into the exhaust duct 55.

The apparatus of the present embodiment includes an exhaust gas recirculation (EGR) system 51. The EGR system 51 includes an EGR passage 52 leading the exhaust gas to the intake duct 20 and an EGR valve 53 located in the middle of the passage 52. The passage 52 connects the exhaust duct 55 to a point downstream of the throttle valve 23. The valve 53 includes a valve seat, a valve body, and a step motor (none of these shown). The opening degree of the valve 53 fluctuates in accordance with the operation of the step motor.

When the valve 53 opens, some of the exhaust gas discharged in the exhaust duct 55 flows into the EGR passage 52 and then flows to the intake duct 20 through the valve 53. That is, some of the exhaust gas is recirculated by the EGR system 51 and mixed with intake air. The valve 53 adjusts the recirculation amount of the exhaust gas.

Further, in the exhaust duct 55, a catalyst 56 for storing and reducing nitrogen oxides (NOx) is provided. When the air-fuel ratio is lean, NOx in the exhaust gas is stored in the catalyst 56. On the other hand, when the air-fuel ratio is rich, the ratio of HC in the exhaust gas increases, and the HC reduces the NOx stored in the catalyst 56 to nitrogen gas ($N_2$), which is emitted to the atmosphere.

Adjustment of air-fuel ratio based on the state of the catalyst 56 is called rich-spike control. Rich-spike control increases the injection amount from the injector 11. When rich-spike control is performed, NOx is removed from the catalyst 56.

The ECU 30 for controlling the engine 1 includes a RAM (random access memory) 32, a ROM (read only memory) 33, a CPU (central processing unit) 34, an input port 35 and an output port 36. These are connected by a two-way bus 31.

A sensor 26A is connected to an accelerator pedal 24, which is manipulated by the driver. The sensor 26A detects the depression amount of the pedal 24 (accelerator opening degree ACCP) and outputs a signal proportional to the accelerator opening degree ACCP. The output signal is sent to an input port 35 through an AD converter 37. Also, a switch 26B is provided in the pedal 24. The switch 26B detects the operation of the pedal 24 and sends a high signal, or a signal represented by the digit one, to the input port 35 when the pedal 24 is not depressed and a low signal, or a signal represented by zero, when the pedal 24 is depressed.

A TDC (top dead center) sensor 27 generates a pulse when the piston in the first cylinder 1a reaches TDC. The pulse is sent to the input port 35. A crank sensor 28 generates a pulse every time the crankshaft rotates thirty degrees CA (crank angle). The pulse signal is sent to the input port 35. The CPU 34 calculates the crank position and the engine speed NE based on a pulse signal from the TDC sensor 27 and a pulse signal from a crank sensor 28.

The opening degree of the swirl control valve 17 (SVC opening degree) is detected by a sensor 29 that detects a rotation angle of the shaft 18. The detected signal is sent to the input port 35 through the A/D converter 37. The throttle sensor 25 detects the throttle opening degree. The detected signal is also sent to the input port 35 through the A/D converter 37.

The surge tank includes a pressure sensor 61 for detecting the pressure in the tank 16, that is, the intake pressure. The coolant circuit of the engine 1 has a temperature sensor 62 for detecting the coolant temperature. An oxygen sensor 63 is located upstream of the catalyst 56 in the exhaust duct 55. The oxygen sensor 63 detects the oxygen density in the exhaust and outputs a signal corresponding to the air-fuel ratio A/F. The voltage of the output signal is set to differ greatly between when the air-fuel ratio is slightly smaller than a predetermined air-fuel ratio and when the air-fuel ratio is slightly greater than the predetermined air-fuel ratio. In the vicinity of the valve 53, an EGR sensor 64 is provided for detecting the opening degree of the valve 53, that is, the EGR opening degree. The detection signals from the sensors 61, 62, 63, 64 are sent to the input port 35 through the A/D converter 37.

The output port 36 is connected to the fuel injector 11, the step motors 19, 22, the ignitor 12, and the step motor of the valve 53 through corresponding drive circuits 38. The ECU 30 optimally controls the injector 11, the step motors 19, 22, the ignitor 12 (ignition plug 10), and the valve 53, based on the signals from the sensors 25–29, 61–64, according to a control program stored in the ROM 33.

A program for performing rich spike control of the combustion controller will now be described in reference to a flowchart. The program is executed at predetermined crank angle intervals.

Figure 3:
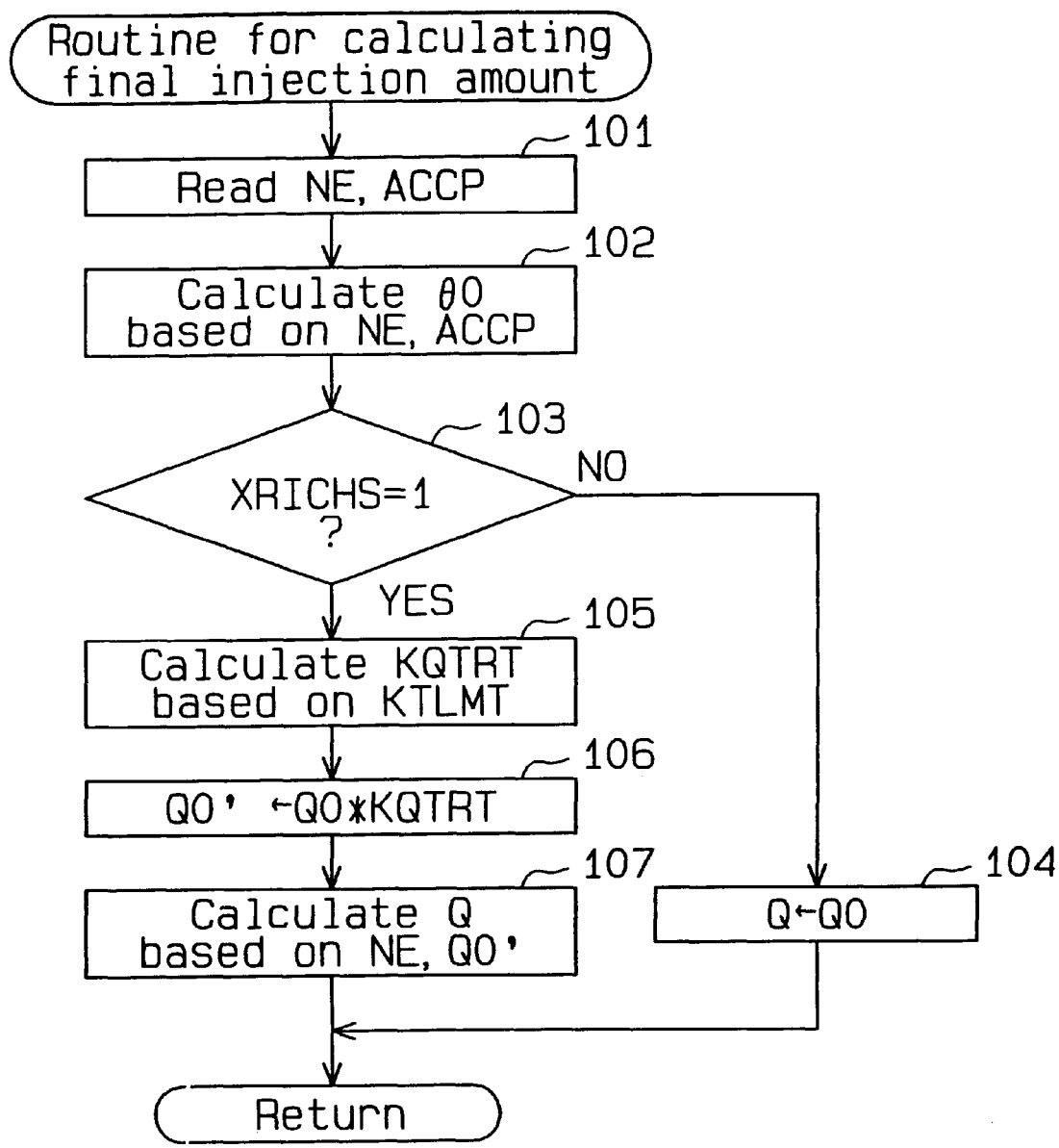
FIG. 3 is a flowchart of a routine for final injection amount calculation executed by the ECU of FIG. 1.

The flowchart of FIG. 3 shows a routine for calculating a final injection amount Q with the ECU 30. At step 101, the ECU 30 reads the engine speed NE and the accelerator opening degree ACCP. At step 102, the ECU 30 calculates a temporary basic injection amount Q0 based on the currently read engine speed NE and the accelerator opening degree ACCP, with reference to a map (not shown).

At step 103, the ECU 30 judges whether a rich-spike flag XRICHS is set to one or not. The rich-spike flag XRICHS concerns the execution of a rich-spike control procedure. When the flag XRICHS is one, the rich-spike control procedure is executed and when the flag XRICHS is zero, the rich-spike control procedure is not executed.

The flag XRICHS is set by another routine not shown here. In that routine, the ECU 30 calculates the amount of NOx stored in the catalyst 56 per unit time under current operating conditions and then calculates the total amount of NOx currently stored in the catalyst 56. When the total storage of NOx exceeds a predetermined upper limit value, the rich spike flag XRICHS is set to one. When the total NOx storage is substantially zero after the execution of the rich-spike control procedure, the flag XRICHS is set to zero.

When the flag XRICHS is zero at step 103, rich-spike control is not executed and the program goes to step 104. At step 104, the basic injection amount QO is set as a final injection amount Q. At this point, the routine finishes and returns to a next calculation cycle.

On the other hand, when the flag XRICHS is one at step 103, the program goes to step 105. At step 105, the ECU 30 calculates a throttle torque sensitivity coefficient KQTRT, which is based on a throttle compensation coefficient KTLMT. The throttle compensation coefficient KTLMT is a coefficient set by a torque limit control procedure performed under normal operating conditions. The torque limit control procedure optimizes the air-fuel ratio with respect to fuel economy and exhaust emissions for lean burn combustion. The torque limit control procedure is executed by another routine (different from the routine of FIG. 3) to maintain the engine torque fluctuation below a predetermined permissible value. The opening degree of the throttle valve 23 is controlled by the torque limit control procedure and fed back to the ECU 30, so that the torque fluctuation of the engine 1 will reach the target value. The throttle compensation coefficient KTLMT is acquired during this feedback control procedure.

Figure 4:
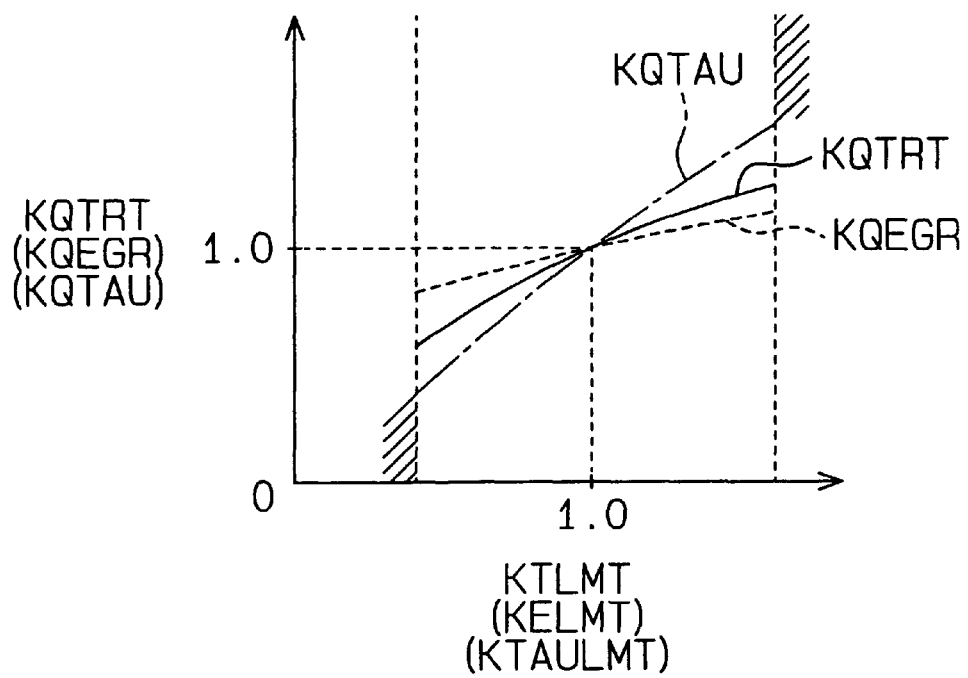
FIG. 4 is a map used in the control of the flowchart of FIG. 3 and shows the relationship between a coefficient KQTRT and a coefficient KTLMT, the relationship between a coefficient KQEGR and a coefficient KELMT, and the relationship between a coefficient KQTAU and a coefficient KTAUKMT.

The throttle torque sensitivity coefficient KQTRT is set based on the map shown in FIG. 4, in accordance with the throttle compensation coefficient KTLMT. That is, when the throttle compensation coefficient KTLMT is set to 1.0 by the limit control procedure, the throttle torque sensitivity coefficient KQTRT is set to 1.0. When the throttle compensation coefficient KTLMT is set to a value over 1.0, the torque sensitivity coefficient KQTRT is also set to a value over 1.0. When the throttle compensation coefficient KTLMT is set to a value below 1.0, the torque sensitivity coefficient KQTRT is also set to a value below 1.0.

Subsequently, at step 106, the ECU 30 multiplies the currently calculated basic injection amount Q0 and the throttle torque sensitivity coefficient KQTRT, and the resulting value is set as a second injection amount Q0'.

(Q0*KQTRT=Q0')

At step 107, the ECU 30 calculates a final injection amount Q based on the currently calculated engine speed NE and second injection amount Q0', according to a map not shown here. This finishes the routine and the program returns to the next calculation cycle.

The operation and advantages of the present embodiment will now be described.

The final injection amount Q of the rich-spike control procedure is calculated using the torque sensitivity coefficient KQTRT, which is based on the throttle compensation coefficient KTLMT, the basic injection amount Q0, and the engine speed NE. The throttle compensation coefficient KTLMT is used to compensate the throttle opening degree and to change the output torque when the torque limit control procedure is performed. On the other hand, the torque sensitivity coefficient KQTRT is used to change the fuel injection amount when rich-spike control is performed.

Accordingly, to perform the temporary rich-spike control procedure when the torque limit control procedure is performed, the torque sensitivity coefficient KQTRT must be calculated based on the throttle compensation coefficient KTLMT. Based on this, a second injection amount Q0' for rich-spike control is obtained and reflected in the final target injection amount Q. Because of this, the final injection amount Q is properly compensated even when the limit control procedure is performed. Accordingly, the torque resulting from the rich-spike control procedure is substantially equal to the torque resulting from the limit-control procedure, thus preventing a sudden torque change. Furthermore, in the rich spike control of the present invention, it is not necessary to detect the actual torque.

In the present invention, the relationships between parameters concerning the rich-spike control procedure are shown in FIG. 4. That is, as the throttle compensation coefficient KTLMT for torque limit control increases, the torque sensitivity coefficient KQTRT increases, and so does the second injection amount Q0'. Therefore, the final injection amount Q obtained from these values is optimized, and a sudden torque change resulting from the rich-spike control procedure is positively prevented.

Further, the final injection amount Q is directly controlled in the present invention. Therefore, the air-fuel ratio is directly controlled and directly reflected in the torque control procedure. As a result, a sudden torque change resulting from the rich-spike control procedure is more certainly and easily prevented.

The present invention is not limited to the above embodiment, and it may further be embodied as follows.

In a second embodiment, the limit-control procedure may control the opening degree of the EGR valve 53 instead of the throttle valve 23. In this case, an EGR sensitivity coefficient KQEGR, which is used in the rich-spike control procedure, is calculated in a step like step 105 of FIG. 3. The EGR sensitivity coefficient is based on an EGR compensation coefficient KELMT, which is used in the limit control procedure to control the torque fluctuation. Thus, in this embodiment, Q0' is based on KQEGR in a step like step 106 of FIG. 3.

In a third embodiment, the limit-control procedure may control the fuel injection amount to control the output torque fluctuation. In this case, an injection amount torque sensitivity coefficient KQTAU, which is used in the rich-spike control procedure, is calculated in a step like step 105 of FIG. 3. The fuel injection sensitivity coefficient KTAU is based on an injection amount compensation coefficient KTAULMT, which is used in the limit control procedure to control the torque fluctuation. Thus, in this embodiment, Q0' is based on KQTAU in a step like step 106 of FIG. 3.

In a further embodiment, the limit-control and rich-spike control parameters vary depending on the combustion mode. For example, when stratified charge combustion is performed, rich-spike control is performed based on limit-control of the EGR valve 53 and, when homogeneous lean burn is performed, rich-spike control is performed based on limit-control of the fuel injector 11. When the control parameters used to calculate the final injection amount Q are varied in accordance with the combustion mode, the precision of rich-spike control improves.

In the air-fuel ratio control, more precise control is possible by calculating the final injection amount Q based on several kinds of controlled objects and parameters.

Figure 5:
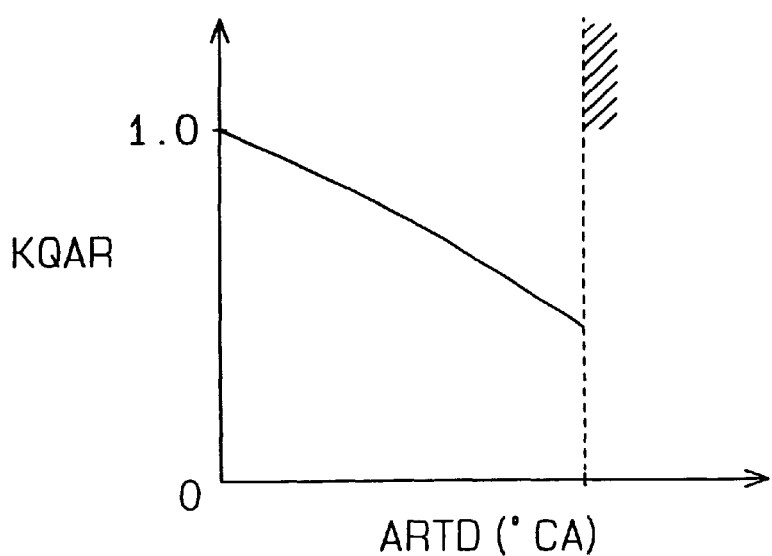
FIG. 5 is a map showing the relationship between a retard amount torque sensitivity coefficient (KQAR) and an ignition timing retard amount (ARTD) in a further embodiment.

The illustrated parameters are all concerned with torque fluctuation control. The injection amount Q is calculated and the air-fuel ratio is compensated based on the torque fluctuation control parameters. The rich-spike control procedure of the present invention may also be performed when controlling characteristics other than torque fluctuation. For example, the air-fuel ratio (injection amount Q) may be compensated based on an ignition timing control procedure for preventing knocking of the engine 1. In this case, as shown in the map of FIG. 5, a retard amount torque sensitivity coefficient KQAR, which is used for rich-spike control, is calculated based on an ignition timing retard amount ARTD expressed by a crank angle. The calculated value KQAR is multiplied by the basic injection amount Q0, and the second injection amount Q0' is then calculated. However, in the relationship between the ignition timing retard amount ARTD and the retard amount torque sensitivity coefficient KQAR, the value of KQAR decreases as the value of ARTD increases. In other words, it is preferable that the second injection amount Q0' decreases as the value of ARTD increases. This control may be combined with some of the above controls.

In the above embodiments, the parameters for controlling the air-fuel ratio are compensated by controlling the final injection amount Q, however, the air-fuel ratio control parameters may be compensated by controlling the air intake amount. In this case, in addition to the construction of the embodiments of FIGS. 1–5, where the throttle valve 23 is electronically controlled by controlling an actuator 22, an idle control valve may be provided in a passage bypassing the throttle valve 23.

The present invention may be embodied in common stratified charge combustion engines or weak stratified charge engines. The present invention may also be embodied in the following engines: engines that inject fuel towards the upper side of the intake valves 6a, 6b of the intake ports 7a, 7b; engines that have an injector on the side of the intake valves 6a, 6b, so that the injector directly injects fuel in the cylinder bore (combustion chamber 5); engines that perform lean burn or stoichiometric combustion; and engines that do not change combustion mode. The device to generate swirl can be omitted from the above engines.

The present invention may also be embodied in diesel engines and other internal combustion engines. It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A lean burn engine including a combustion chamber for burning an air-fuel mixture and an exhaust passage for discharging exhaust gas, the engine being operated and controlled according to a compensation value for preventing torque fluctuation of the engine, the engine comprising:

a catalyst in the exhaust passage for storing nitrogen oxides contained in the exhaust gas when the air-fuel ratio of the air-fuel mixture is lean and for reducing and emitting the stored nitrogen oxides when the air-fuel ratio is rich;

a determiner for determining whether to change the air-fuel ratio of the air-fuel mixture to rich, based on the state of the catalyst; and a controller for temporarily changing the air-fuel ratio to rich based on the decision of the determiner, wherein the controller calculates an air-fuel ratio control value for changing the air-fuel ratio to rich based on the compensation value, so that the nitrogen oxides stored in the catalyst will be reduced and emitted.

2. The engine according to claim 1, wherein the controller changes the air-fuel ratio so that an engine output torque remains substantially unchanged.

3. The engine according to claim 2, wherein the air-fuel ratio control value increases as the compensation value increases.

4. The engine according to claim 1, wherein the controller changes the air-fuel ratio by changing the amount of supplied fuel.

5. The engine according to claim 1, wherein the determiner calculates the amount of nitrogen oxides stored in the catalyst and determines whether to change the air-fuel ratio when the amount of nitrogen oxides exceeds a predetermined storage amount of the catalyst.

6. The engine according to claim 1, wherein the controller changes the air-fuel ratio by changing an intake-air amount.

7. The engine according to claim 1, wherein a supplied fuel amount is controlled in accordance with the compensation value.

8. The engine according to claim 1, wherein an air-intake amount is controlled in accordance with the compensation value.

9. The engine according to claim 1 further comprising an exhaust gas recirculation apparatus that reintroduces the exhaust gas to the engine, wherein the recirculation amount of the exhaust gas is controlled in accordance with the compensation value.

10. A lean burn engine including a combustion chamber for burning an air-fuel mixture and an exhaust passage for discharging exhaust gas, the engine being operated and controlled according to a compensation value for preventing engine knocking, the engine comprising:

a catalyst in the exhaust passage for storing nitrogen oxides contained in the exhaust gas when the air-fuel ratio of the air-fuel mixture is lean and for reducing and emitting the stored nitrogen oxides when the air-fuel ratio is rich;

a determiner for determining whether to change the air-fuel ratio of the air-fuel mixture to rich, based on the state of the catalyst; and a controller for temporarily changing the air-fuel ratio of the air-fuel mixture to rich based on the decision by the determiner, wherein the controller calculates an air-fuel ratio control value for changing the air-fuel ratio to rich based on the compensation value, so that the nitrogen oxides stored in the catalyst will be reduced and emitted.

11. The engine according to claim 10, wherein the controller changes the air-fuel ratio so that an engine output torque remains substantially unchanged.

12. The engine according to claim 7, wherein the air-fuel ratio control value decreases as the compensation value increases.

13. The engine according to claim 10, wherein the controller changes the air-fuel ratio by changing the amount of supplied fuel.

14. The engine according to claim 10, wherein the determiner calculates the amount of the nitrogen oxides stored in the catalyst and determines whether to change the air-fuel ratio when the amount exceeds a predetermined storage amount of the catalyst.

15. The engine according to claim 10, wherein the controller changes the air-fuel ratio by changing an intake-air amount.

16. The engine according to claim 10, wherein the ignition timing is controlled in accordance with the compensation value.

17. A method for controlling an engine including a combustion chamber for burning an air-fuel mixture, an exhaust passage for discharging exhaust gas and a catalyst provided in the exhaust passage for storing nitrogen oxides when the air-fuel ratio of the air-fuel mixture is lean and for reducing and emitting the stored nitrogen oxides when the air-fuel ratio is rich, the engine being operated and controlled according to a compensation value for preventing torque fluctuation of the engine, the method comprising the steps of:

setting an air-fuel ratio control value for controlling the air-fuel ratio to rich based on the compensation value, so that an engine output torque remains substantially unchanged: and temporally changing the air-fuel ratio to rich in accordance with the air-fuel ratio control value, so that the nitrogen oxides stored in the catalyst will be reduced and emitted.

18. A method for controlling an engine including a combustion chamber for burning an air-fuel mixture, an exhaust passage for discharging exhaust gas and a catalyst provided in the exhaust passage for storing nitrogen oxides when the air-fuel ratio of the air-fuel mixture is lean and for reducing and emitting the stored nitrogen oxides when the air-fuel ratio is rich, the engine being operated and controlled according to a compensation value for preventing knocking of the engine, the method comprising the steps of:

setting an air-fuel ratio control value for changing the air-fuel ratio to rich based on the compensation value, so that an engine output torque remains substantially unchanged; and temporally changing the air-fuel ratio to rich in accordance with the air-fuel ratio control value, so that the nitrogen oxides stored in the catalyst will be reduced and emitted.

* * * * *

UNITED STATES PATENT AND TRADEMARK OFFICE
CERTIFICATE OF CORRECTION

PATENT NO.   : 6,237,329 B1  
DATED        : May 29, 2001  
INVENTOR(S)  : Hiroyuki Mizuno Page 1 of 1

It is certified that error appears in the above-identified patent and that said Letters Patent is hereby corrected as shown below:

<u>Column 9,</u>  
Line 23, change "claim 7" to -- claim 11 --.

Signed and Sealed this

Fourteenth Day of May, 2002

Attest:

*Attesting Officer*

JAMES E. ROGAN  
*Director of the United States Patent and Trademark Office*